UNITED STATES PATENT OFFICE.

FREDERICK K. FISH, JR., OF NEW YORK, N. Y., ASSIGNOR TO LUMBER TIE AND TIMBER VULCANIZING COMPANY, OF NEW YORK, N. Y.

STERILIZED WOOD.

1,328,506.   Specification of Letters Patent.   Patented Jan. 20, 1920.

No Drawing. Application filed September 27, 1916, Serial No. 122,415. Renewed April 18, 1919. Serial No. 291,171.

*To all whom it may concern:*

Be it known that I, FREDERICK K. FISH, Jr., a citizen of the United States, and resident of New York, in the county of New York and State of New York, have invented a certain new and useful Sterilized Wood, of which the following is a specification.

This invention relates to a new and improved article of manufacture which is a wood having certain inherent and distinguishing characteristics which render it superior for the various uses to which wood is ordinarily put.

My improved wood has the major portion of its moisture, and certain of the water-soluble constituents removed, and its resins or resin producing content dislodged from the interstices of the wood fibers which they occupy more or less irregularly in their nature. The resins in the improved wood are not only distributed throughout the whole body of the structure and among its fibers, but are permeated into or caused to penetrate the individual fibers themselves, so that, to at least the extent permitted by the proportion of resins in the wood, the fibers are saturated by the resins as distinguished from mere envelopment or deposition of the resins upon their surfaces.

The underlying characteristic condition of the wood constituting the new article of manufacture will be better appreciated when it is stated that it is a condition resulting from a preliminary treating of the wood, and the use of water or an equivalent vehicle capable of softening and enlarging the fibers and removing the water soluble constituents, and melting the resins or resin producing content and causing the melted resins to permeate the individual fibers.

In order to realize the benefits of the invention to the fullest measure, certain other steps are resorted to in addition to the step of softening the fiber and melting the resins. The softening treatment however is one of the most important and essential steps of the process, and it is required to be carried on by the use of superheated water as distinguished from a mere pressure or heat conveying medium, such as steam. For instance, after the step of treating the wood in water, under considerable pressure, it may be treated alternately to vacuum and pressure, with suitable heating steps, if necessary, to prevent hardening of the resins until the process is complete; these additional steps having the effect of insuring permeation of the resins into the body of the fiber, and not merely precipitating it upon the surfaces of the fiber in the form of an envelop.

Structurally, wood consists of a skeleton of cellulose intermingled with other organic substances, collectively designated as lignin, together with a minor proportion of mineral matter or ash. Lignin, while not fully understood chemically, is closely allied to the cellulose element of the wood, and since it forms a part of the permanent structure of the wood, it may, for purposes of the present invention, be regarded identical with the cellulose.

Recognizing the structure of wood, and its contained substances and to utilize the bases of the resins, acetic acid and tannic acid, as preservatives and as a means for improving the wood, I have arranged the various steps of the process to dislodge these constituents from their cellular confinement, separate them from their aqueous solvent or vehicle and properly distribute them through the cellular and fibrous structure of the wood to take the place of the removed water soluble substances.

The release and conversion of the resins and resin producing substances, is accomplished, according to my invention by boiling the green wood under pressure, preferably of about twenty pounds, for a sufficient period, usually about one hour, to thoroughly open up the pores of the wood, dissolve the water soluble gums and sap contained in the wood and remove them from the wood and thereby put the wood in good physical condition to readily give up its aqueous content, without checking or other physical deterioration of the wood; this boiling step being preferably preceded by submitting the wood to vacuum that renders it more receptive to the boiling water.

The wood being thus put in proper condition to give up its moisture, and being at a temperature throughout which readily converts water into steam, the superheated water is removed from the presence of the wood under conditions that cause the high boiling pressure to give place to a vacuum, preferably of about twenty inches; this change of condition from liquid pressure to vacuum being effected as promptly as possible—say in about fifteen minutes. This second mentioned vacuum is maintained for a sufficient time to cause the aqueous content of the wood to largely evaporate, without taking with it the resins or the resin producing substances. The evaporation period is not continued long enough to greatly cool down the wood, or cause its surface pores to close; and in order to continue the evaporation of the moisture from the interior of the wood under conditions that keep up the internal heat and prevent external drying or danger of checking, the vacuum is gradually replaced by an artificial atmosphere of high temperature, say about 290° F. conveniently created by supplying steam to the container in which the wood is being treated, and at the same time keeping up the temperature. Some pressure is maintained during this step—say about thirty pounds—and the step is continued for, say, one-half hour and has the effect of evaporating a portion of the moisture, and causing some expansion in the wood and restoring the internal temperature of the wood well above the boiling point and keeping the retained resins and resin producing substances in good permeating condition.

Next, the now thoroughly softened wood with high internal temperature, and in favorable condition to give up moisture without violence to the structure, is again subjected to a partial vacuum, say of about fifteen inches, but this time under heat alone. This or the third mentioned partial vacuum is preferably continued for about two hours, but the partial vacuum may be increased—say to twenty-five inches—toward the end of the step—say for the last half hour thereof. This step evaporates a portion of the moisture, and causes expansion in the wood and also has the effect of causing the resins to be uniformly distributed throughout the wood structure. Finally, the wood is subjected to what I term "an equalizing step", which consists in maintaining around it, atmosphere at a temperature, sufficient to cause continuous evaporation of moisture throughout the mass of wood, at the same time keeping the resins in a melted condition until the wood is thoroughly dry. It is during this step that permeation of the cellulose and fiber of the wood by the melted resins takes place; a current of air being set up intermittently to carry off the accumulating moisture, if desired.

Wood thus treated will be thoroughly dried without removing the resins, or the resin producing substances, and the latter will be permeated throughout the entire cellular structure and the moisture will have been evaporated. Because of the distribution of the resins, the wood has been rendered homogeneous throughout, and so treated, by its natural preservatives as to lend to it, distinctive characteristics that make it a new article of manufacture. That is to say, the wood will be indurated, sterilized, thoroughly permeated by the resins and rendered less hygroscopic, and correspondingly immune from spores or fermentation or the like. And all these conditions are attained without checking, warping, case hardening or other deterioration of the physical characteristics of the wood.

By way of further explanation, and affording appreciation of the conditions produced, it may be added that the contents of the wood, other than its resin, or resin producing ingredients, are removed from the wood and the resins are distributed to take the place of the removed substances. The resins are also removed from their natural position in the interstices of the fibers and are infused into the body of the fibers themselves. When the wood is finally dried from the interior outward, the fibers will appear more closely together due largely to the extraction of the water soluble substances, and the substitution of the resins which results in a more solid and compact physical structure; yet the weight will be less because of the original moisture and water soluble ingredients having been removed from the wood, but it will not have suffered abnormal shrinkage as compared with the ordinary wood curing processes, because the individual fibers themselves have been enlarged and permeated by the resins.

As a result of these conditions, the structure and appearance of the wood is transformed and the product from the treatment of a piece of yellow pine, for instance, will closely approach the appearance of a hard wood and will require approximately fifty per cent. less of a filler coat in painting, by reason of the compactness of its surface which reduces its absorbent tendency substantially fifty per cent. and its hygroscopicity will have been rendered practically negligible.

In producing the improved wood, the boiling step is continued long enough to melt the resins without destroying the life in same. This step is to be distinguished from "cooking" the wood to destroy the life, as it is highly important that the resins be prevented from hardening to retain their preservative qualities.

The steps employed in producing the wood, expel a portion of the sap water, and further cause the wood to be uniformly colored or tanned. There is a portion of the insoluble sap which is converted into insoluble, and the latter is retained in the wood structure, the colloids being retained and absorbed on the fibers.

The method for producing the improved wood is not claimed herein, as same forms the subject-matter of my co-pending application, Serial Number 121,187, filed Sept. 20, 1916, to which reference may be had for disclosure of means suitable for carrying out the steps of the method.

What I claim is:—

1. As a new article of manufacture, wood having its gummy sap matters removed therefrom and its natural preservatives disseminated throughout the wood structure.

2. As a new article of manufacture, a dry wood having its soluble gums and sap removed therefrom and its individual fibers permeated with its resins.

3. As a new article of manufacture, wood having its gummy sap matters removed from the interstices thereof and the interstices filled with its resin.

4. As a new article of manufacture, wood having its gummy sap matters removed therefrom, its resins disseminated therethrough and dried therein.

5. As a new article of manufacture, wood having its fibers enlarged and its gummy sap matters removed therefrom.

6. As a new article of manufacture, a dry wood having its soluble gums and sap removed therefrom, its individual fibers enlarged and its interstices filled with its resins.

7. As a new article of manufacture, a dry wood having its soluble gums and sap removed therefrom, its individual fibers enlarged and permeated with its resins.

8. A treated and sterilized preserved wood having soluble gums and sap water removed therefrom, and its natural preservatives retained and distributed throughout the structure of the wood.

9. A preserved or treated wood having soluble gums and sap water removed therefrom, and its natural preservatives retained and distributed throughout the structure of the wood.

10. As a new article of manufacture, a sterilized wood having a portion of its soluble part of its sap removed and the preservative part of the sap, or as much of it as has not been converted into soluble constituents retained and set therein, and its individual fibers permeated by its resins.

11. As a new article of manufacture, a wood having its individual fibers enlarged and permeated by its natural preservatives.

12. A wood treated with its water soluble sap matter in solution to unify its coloring, and the major portion of its water soluble sap matter removed, the resins being disseminated throughout the wood structure.

13. As a new article of manufacture, a dry wood having its natural preservatives permeated through the fibers and set therein.

14. As a new article of manufacture, a dry wood having water soluble matters removed therefrom and its natural preservatives diffused therethrough.

15. As a new article of manufacture, a wood having water soluble organic matter removed and its natural preservatives permeated through the fibers and set therein.

16. As a new article of manufacture, a wood having a portion of its sap removed, the resins being retained and set therein.

17. A tanned wood having soluble gums and sap water removed therefrom, and its colloids retained and adsorbed on the fibers of the wood.

18. A preserved or treated wood having soluble gums and sap water removed therefrom, its natural preservatives retained and its colloids adsorbed on the fibers of the wood.

19. A sterilized wood having soluble gums and sap water removed therefrom, and its colloids retained and adsorbed on the fibers of the wood.

20. A substantially non-hygroscopic wood having soluble gums and sap water removed therefrom, and its natural preservatives retained and distributed throughout the structure of the wood.

21. A sterilized substantially non-hygroscopic tanned wood having a major portion of its moisture content removed, and its resins distributed therein.

In testimony whereof I affix my signature.

FREDERICK K. FISH, Jr.